March 12, 1929.  E. W. WEED  1,705,431
WAGON LOADING APPARATUS
Original Filed Nov. 18, 1926    3 Sheets-Sheet 1
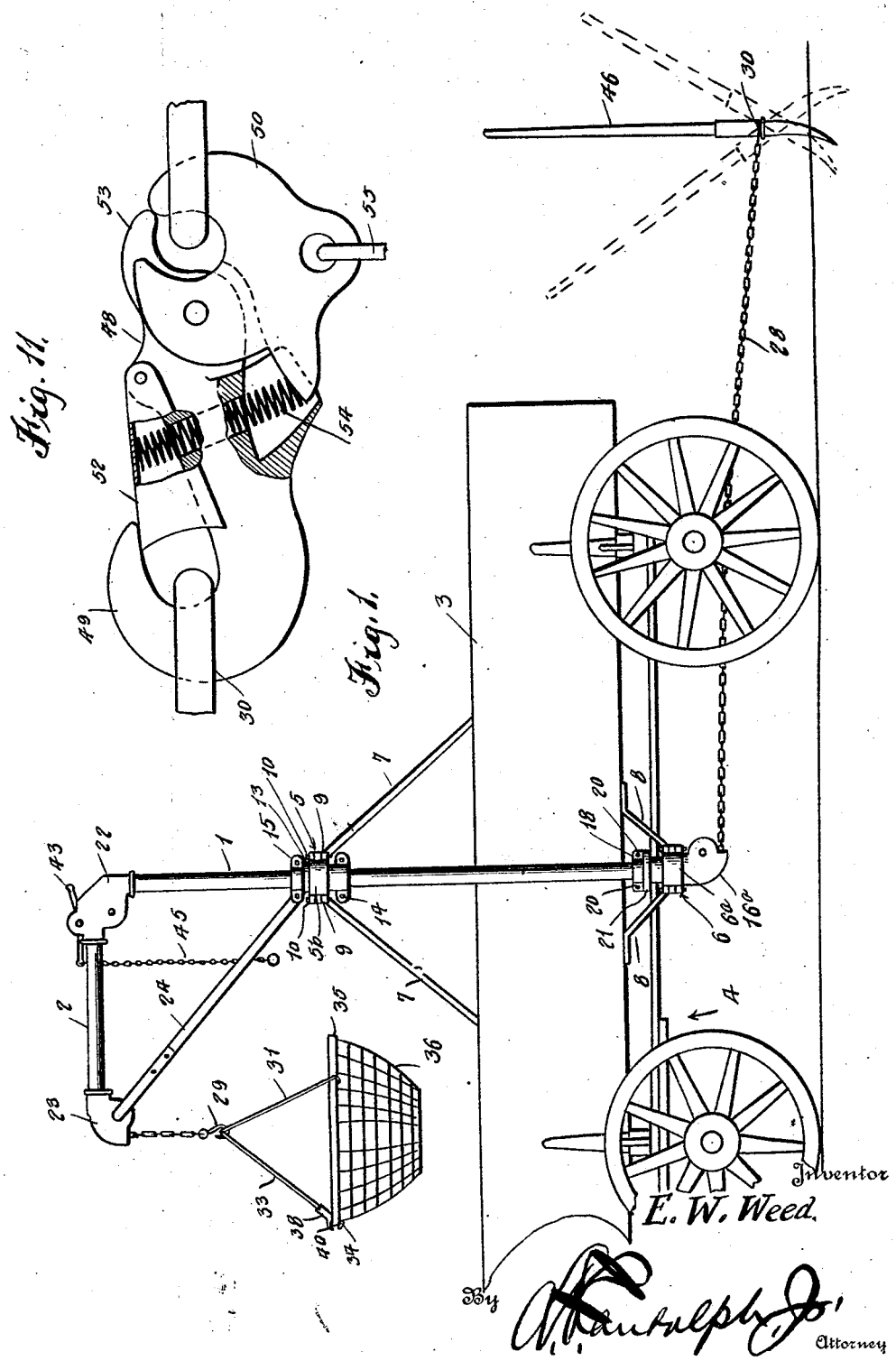

March 12, 1929.  E. W. WEED  1,705,431
WAGON LOADING APPARATUS
Original Filed Nov. 18, 1926   3 Sheets-Sheet 2
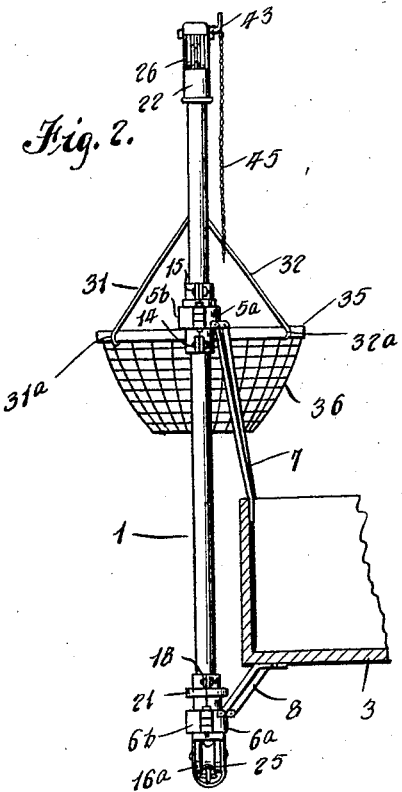
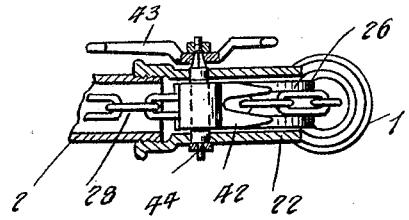
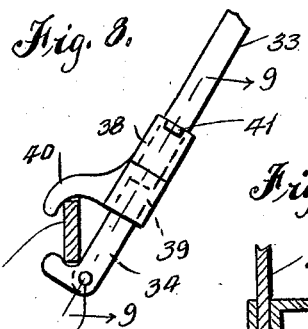
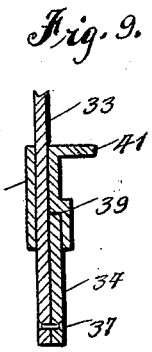
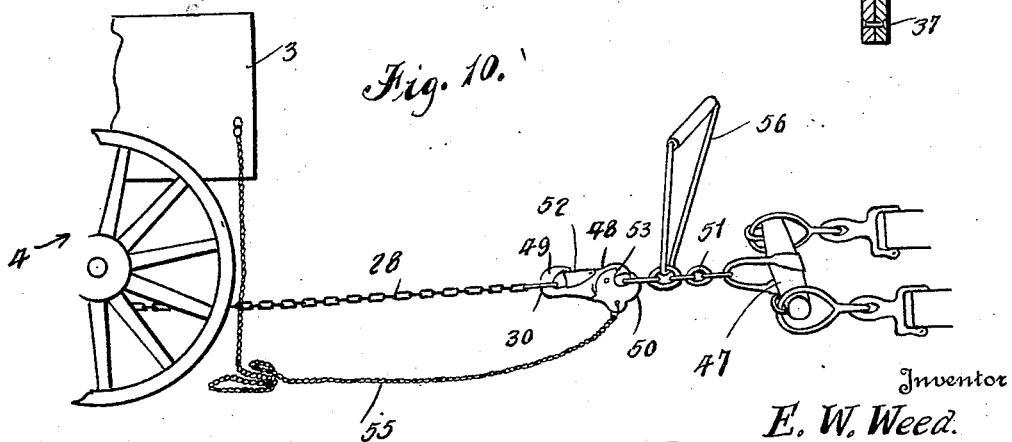
Inventor
E. W. Weed.

March 12, 1929.  E. W. WEED  1,705,431
WAGON LOADING APPARATUS
Original Filed Nov. 18, 1926   3 Sheets-Sheet 3
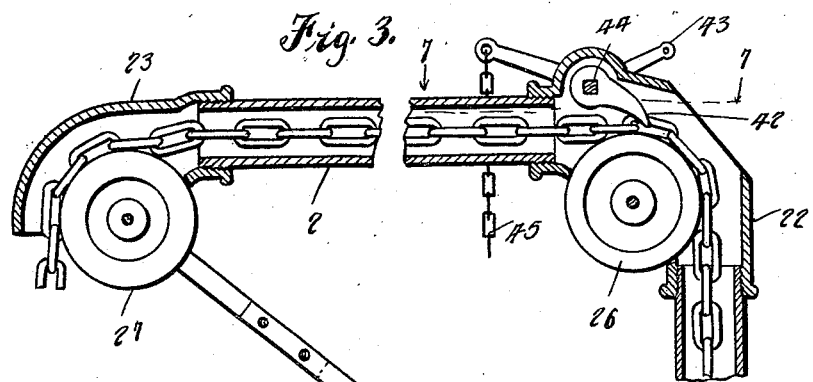
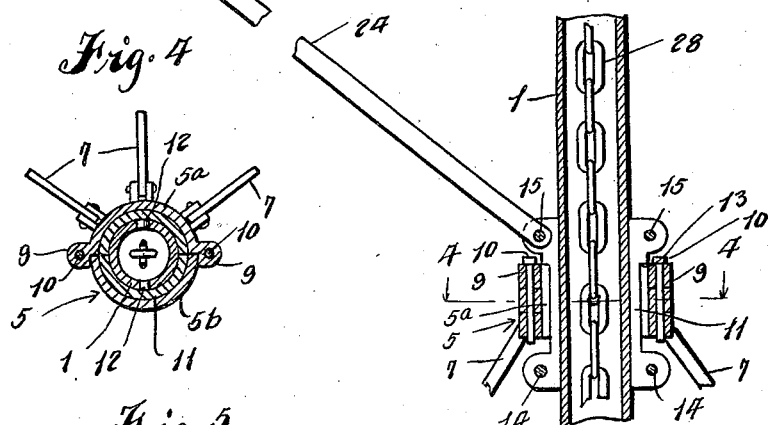
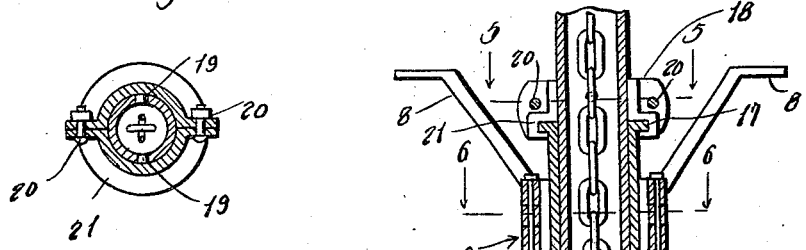
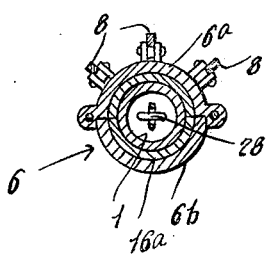
Inventor
E. W. Weed.

Patented Mar. 12, 1929.

1,705,431

UNITED STATES PATENT OFFICE.

EMIL WILLIAM WEED, OF RAYMOND, ALBERTA, CANADA.

WAGON-LOADING APPARATUS.

Application filed November 18, 1926, Serial No. 149,235. Renewed July 26, 1928.

This invention relates to and has for one of its objects to provide a novel, simple and inexpensive apparatus through the medium of which a wagon may be easily and quickly loaded in the field with sugar beets, garden truck and all other crops that may be gathered in baskets, with farm products in sacks, bails, bundles, shocks, and sheaves, and with manure and stones in piles or scattered.

With the foregoing and other objects in view, the nature of which will become apparent as the description proceeds, the invention consists of the construction, combination and arrangement of parts hereinafter fully described and claimed, and illustrated in the accompanying drawings, wherein:

Figure 1 is an elevational view illustrating the application of the loading apparatus to a farm wagon, Figure 2 is a view in rear elevation of the loading apparatus with the body of the wagon in vertical section, Figure 3 is a sectional view taken on a vertical plane extending centrally and longitudinally through the loading apparatus, Figure 4 is a detail sectional view taken on the horizontal plane indicated by the line 4—4 of Figure 3, Figure 5 is a detail sectional view taken on the horizontal plane indicated by the line 5—5 of Figure 3, Figure 6 is a detail sectional view taken on the horizontal plane indiacted by the line 6—6 of Figure 3, Figure 7 is a detail sectional view taken on the horizontal planes indicated by the line 7—7 of Figure 3, Figure 8 is a view in side elevation of the lower portion of one of the sling hooks of the loading apparatus, Figure 9 is a sectional view taken on the plane indicated by the line 9—9 of Figure 8, Figure 10 is a view illustrating one manner in which the chain of the loading apparatus may be operated to elevate the load above the wagon, and Figure 11 is a detail view partly in elevation and partly in vertical section of the automatic release hook of the chain operating means.

Corresponding and like parts are referred to in the following description, and designated in the several views of the accompanying drawings, by similar reference characters.

The loading apparatus is adapted to be supported from a wagon at one side and intermediate the ends thereof, and comprises a hollow post 1 and a hollow arm 2. The post 1 extends above and below the body 3 of the wagon 4, and is supported for rotation about its axis by an upper bearing 5 and lower bearing 6. The bearings 5 and 6 are of the split type to permit the post to be readily applied thereto and removed therefrom, and the bearing 5 is supported by bracket arms 7 and the bearing 6 by bracket arms 8 from the wagon body 3. The section $5^a$ of the bearing 5 is secured to the bracket arms 7, and the section $5^b$ of this bearing is secured to the section $5^a$ thereof by ears 9 and pins 10. When it is desired to open the bearing 5 to permit the insertion of the post 1 therein or its removal therefrom, one of the pins 10 is withdrawn and the section $5^b$ swung laterally on the remaining pin. The bearing 6 is similar to the bearing 5. The section $6^a$ of this bearing is secured to the bracket arms 8, and the section $6^b$ thereof is adapted to be swung laterally with respect to the section $6^a$ to permit the application and removal of the post 1.

A split bushing 11 positioned within the bearing 5 about the post 1, is secured to the post by pins 12, and is provided with an annular outer shoulder 13 which rests upon the upper end of the bearing to support the post within the bearings 5 and 6. The sections of the bushing 11 are provided with ears 14, and are secured together by bolts 15 which engage the ears. A sleeve 16 surrounds the lower end of the post 1 and extends through and above and below the bearing 6, and is provided with a laterally directed and enlarged lower end $16^a$. The upper end of the sleeve 16 is provided with an outer flange 17 which is rotatably engaged with a hanger 18 which is of the split type. The hanger 18 passes about the post 1 and is secured thereto by pins 19, and the sections of the hanger are connected by bolts 20. The lower end of the hanger 18 is laterally enlarged as shown at 21 and provided with a groove for the reception of the flange 17 on the sleeve 16.

The arm 2 extends horizontally from the upper end of the post 1, and is secured to the post by a hollow coupling 22. A hollow support 23 is secured to the outer or free end of the arm 2, and connected to said support and the bushing 11 is a brace bar 24. Grooved pulleys 25, 26 and 27 are carried by the enlarged lower end $16^a$ of the sleeve 16, the coupling 22 and support 23, respectively. A flexible member which is preferably in the form of a chain 28 passes through the sleeve 16, post 1, coupling 22, arm 2 and support 23 and passes about the pulleys 25, 26 and 27. Alternate links of the chain 28 contact with the periphery and enter the groove of each of the rollers 25, 26 and 27. A hook 29 is secured to the load end and a loop 30 to the power end of the chain 28, and a sling consisting of rods 31, 32 and 33 is removably engaged with the hook 29. The sling rods 31 and 32 are provided with fixed hooks 31ª and 32ª, respectively, and the sling rod 33 is provided with a pivoted hook 34, which engage the rim 35 of a load carrying basket 36. The hook 34 is pivoted to the sling rod 33 as at 37, and is held against casual movement with respect to the rod by a collar 38. The collar 38 is slidably mounted upon the sling rod 33, and is provided with a recess 39 which receives the hook 34 and with a hook 40 which engages the basket rim 35. The collar 38 is also provided with a laterally projecting lug 41 through the medium of which it may be raised on the sling rod 33 when it is desired to release the hook 34. When this hook is released, the basket 36 tilts on the sling rods 31 and 32 with the resulting discharge of its contents or load into the wagon body 3.

The chain 28 is held against casual movement in load lowering direction by a forked dog 42 which is pivoted within the coupling 22 and held by gravity in engagement with the chain. A lever 43 secured to the pivot 44 of the dog 42, and a pull chain 45 connected to an end of the lever, provide means by which the dog may be raised out of engagement with the chain when it is desired to move the latter in load lowering direction. When the pull chain 45 is released the dog 42 returns automatically to chain engaging position.

The basket 36 may be elevated into load discharging position, that is into a position above the wagon body 3, while the wagon 4 is in motion or at rest. When it is desired to elevate the basket 36 into this position while the wagon 4 is in motion, a lever 46 is employed to hold the power end of the chain against movement, and the lever is adapted to be removably engaged with the chain loop 30 and the ground in the manner shown in Figure 1. When it is desired to move the chain in load elevating direction with the wagon 4 at rest, a draft animal is employed, and a singletree 47 is connected to the chain loop 30 by a coupling 48. The coupling 48 is provided at one end with a fixed hook 49 which is engaged with the chain loop 30, and at its other end with a pivoted hook 50 which is engaged with a chain 51 secured to the singletree 47. A pivoted guard 52 is provided for the hook 49, and a fixed guard 53 is provided for the hook 50. The guard 52 and hook 50 are yieldingly supported in their active positions by a spring 54. A chain 55 which is secured at one end to the wagon body 3 and at the other to the hook 50, is adapted to move its hook 50 into inactive position after the basket 36 has been elevated far enough to carry it into load discharging position, whereby to release the draft animal from the chain 28. The singletree 47 may be supported out of contact with the ground by the driver of the draft animal through the medium of a hand loop 56 secured to the chain 51.

In practice, the crops to be gathered may be placed in baskets, and the loaded baskets may be deposited in the field at points where they are loaded. The wagon carrying the loading apparatus may then be driven over the field from basket to basket. The basket to be dumped into the wagon 4, is engaged by the sling rods 31, 32 and 33. The lever 46 is then engaged with the ground and the wagon set in motion with the result that the basket 36 is elevated above the wagon body 3. When the basket has reached the desired height the lever 46 is disengaged from the ground, the basket being held against downward movement by reason of the engagement of the dog 42 with the chain 28. The post 1 is then turned about its axis to position the basket 36 at the desired point over the wagon body 3, and thereafter the hook 34 of the sling rod 33 is released to permit the basket to tilt upon the sling rods 31 and 32, with the result that the contents of the basket is deposited in the wagon body. When it is desired to elevate the basket with the wagon at rest, a draft animal is connected to the power end of the chain 28 by the coupling 48, and the chain 50 is connected to the wagon body 3. The draft animal is driven in a direction away from the wagon, and when the basket has been elevated to the desired position above the wagon body 3, the chain 55 functions to move the hook 50 into inactive position, whereupon the draft animal is detached from the chain 28. As the post 1 may be turned about its axis with respect to the sleeve 16, as the sleeve 16 may be turned about its axis independently of the post 1, the chain 28 may be operated from either end or side of the wagon 4 and that portion of the chain extending below and beyond the pulley 25 will not interfere with the free turning of the post. If desired the baskets instead of being dumped may be placed in the wagon body 3. It is recommended that this be done when gathering beets in order to reduce to the minimum the number of times the beets must be handled in gathering and storing them. As the apparatus permits beets to be quickly gathered and stored, the shrinkage which now takes place while the beets are laying in the field to be gathered and hauled away may be avoided. The apparatus may be also used for the purpose of removing the load from the wagon, and it may be operated with the expenditure of comparatively little labor on the part of the operator and draft animal.

What is claimed is:—

1. A wagon loading apparatus comprising an upper bearing supported from the wagon, a post journaled in the bearing for movement about a vertical axis, an arm secured to the post, pulleys journaled on the arm, a lower bearing supported from the wagon, a member journaled in the lower bearing for rotation about said axis independently of and with the post, a pulley journaled on said member, and a flexible member passing about the pulleys.

2. A wagon loading apparatus comprising an upper bearing supported from the wagon, a hollow post journaled in the bearing for movement about a vertical axis, a hollow arm secured to the upper end of the post, pulleys journaled in the arm, a lower bearing supported from the wagon, a sleeve journaled in the lower bearing for rotation about said axis independently of and with the post, a pulley journaled in the sleeve, and a flexible member passing through the arm, post and sleeve and about the pulleys.

3. A wagon loading apparatus comprising an upper bearing supported from the wagon, a hollow post journaled in the bearing for movement about a vertical axis, a hollow arm secured to the upper end of the post, pulleys journaled in the arm, a lower bearing supported from the wagon and into which the lower end of the post extends, a sleeve surrounding the lower end of the post and journaled in the bearing for rotation about said axis independently of and with the post, means for rotatably supporting the sleeve from the post, a pulley journaled in the sleeve, and a flexible member passing through the arm, post and sleeve and about the pulleys.

4. A wagon loading apparatus comprising a post, means supporting the post from the wagon, an arm secured to the post, a flexible member carried by the post and arm, draft means, means connected to the flexible member and provided with a hook engaging the draft means and adapted when in one position to release the draft means, and a member connected to said draft means releasing member to permit the draft means to be released after the flexible member has been moved through a predetermined distance.

5. A wagon loading apparatus comprising a post, means supporting the post from the wagon for movement about its axis, an arm secured to the post, a chain carried by the post and arm, draft means, a coupling connecting the draft means to the power end of the chain and provided with a hook adapted when in one position to release the draft means, and a member connected to the wagon and hook to effect the release of the draft means after the chain has been moved through a predetermined distance.

In testimony whereof I affix my signature.

EMIL WILLIAM WEED.